March 29, 1927.
F. G. KEYES
REFRIGERATION
Filed June 8, 1921
1,622,521
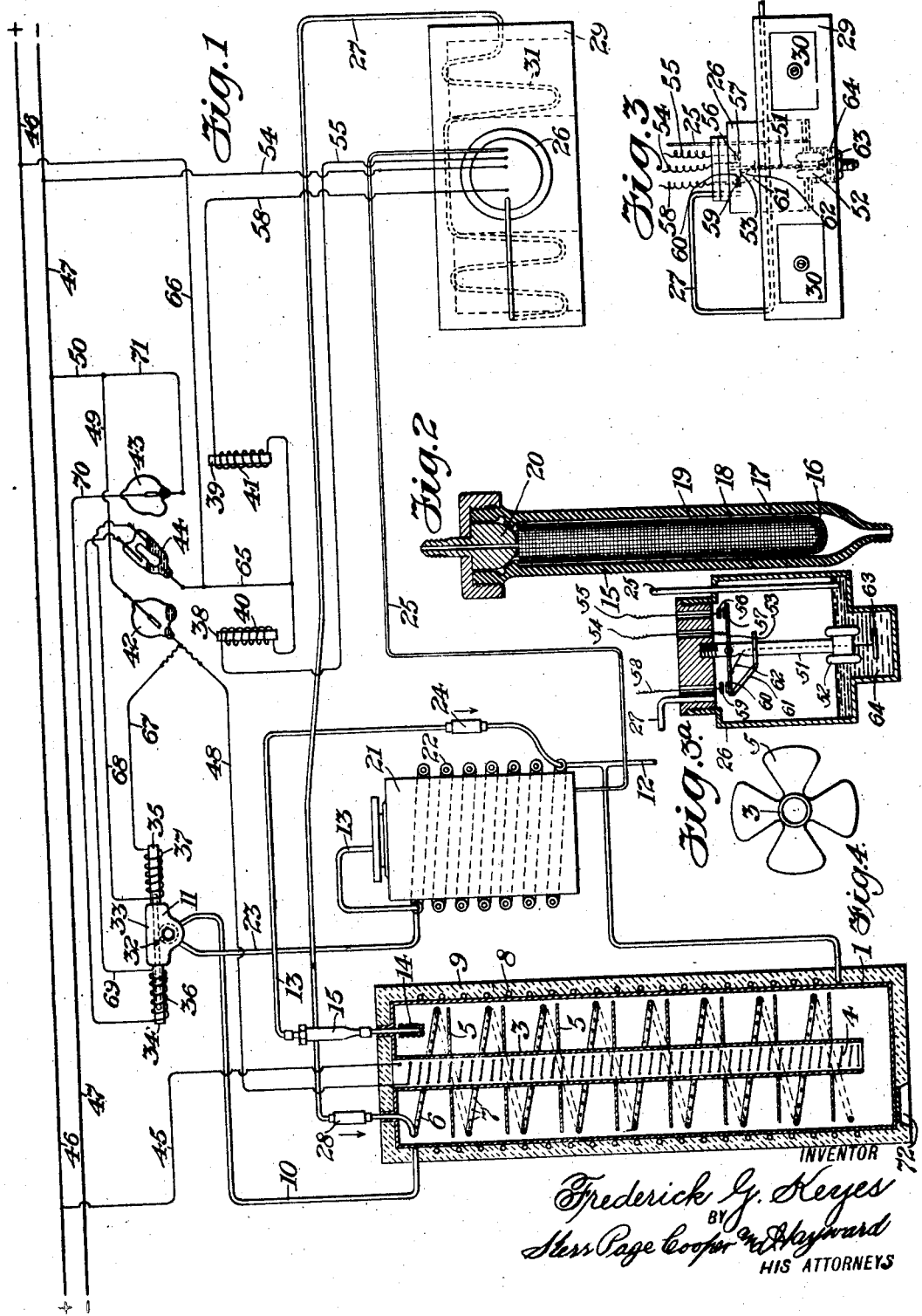
INVENTOR
Frederick G. Keyes
BY
HIS ATTORNEYS Patented Mar. 29, 1927.

1,622,521

UNITED STATES PATENT OFFICE.

FREDERICK G. KEYES, OF CAMBRIDGE, MASSACHUSETTS, ASSIGNOR, BY MESNE ASSIGNMENTS, TO NATIONAL REFRIGERATING COMPANY, OF BOSTON, MASSACHUSETTS, A CORPORATION OF MASSACHUSETTS.

REFRIGERATION.

Application filed June 8, 1921. Serial No. 475,855.

The present invention relates to improvements in refrigerating apparatus and more particularly of the type wherein a refrigerant, such as ammonia, for example, is cyclically distilled, evaporated and returned to and stored either mechanically or chemically in the pores or interstices of a material having an affinity for said refrigerant, and consists of a new, novel and highly efficient apparatus for practising the described process.

The invention further consists in the new gas or liquid storing materials useful in the arts generally, and particularly in refrigerating apparatus.

The invention further consists in the improved still apparatus and the storing material and the mechanisms for operating the still.

The invention further consists in the mechanism and electrical circuits for controlling the operation of the refrigerating apparatus.

The invention further consists in a novel evaporating device for the refrigerant.

The invention further consists in a novel filter member mounted in the piping of the apparatus.

I have illustrated my invention in the accompanying drawings, in which,

Fig. 1 is a diagrammatic representation of my apparatus;

Fig. 2 is a detail sectional view of a filter device for the piping of the apparatus;

Fig. 3 is a side elevation of the evaporating chamber and the brine tank, shown in plan in Fig. 1;

Fig. 3ª is a sectional elevation showing details of a float and contactors in the chamber of Fig. 3, and Fig. 4 is a plan view of a heat disseminating member employed in the still of Fig. 1.

Referring to the drawings, a distillation chamber or a still is shown at 1, containing the refrigerant, ammonia, for instance, and material having an affinity therefor, preferably calcium chloride mixed with a cementitious substance in a friable porous condition. The still, 1, is reentrant in shape and in the reentrant portion, 3, is mounted an electric heater, 4, consisting of an ironclad swaged heater wire of nickel-chromium alloy, tungsten, molybdenum, etc., the said heater being wound so as to press against the walls of the tube, 3, and communicate heat thereto as rapidly as possible. To facilitate the dissemination of the heat from the heater, 4, throughout the interior of the still, disks, 5, are mounted at intervals along the reentrant tube, 3, said disks being shown in detail in Fig. 4. A spiral pipe, 6, is mounted in the wall of the still, the convolutions thereof passing along the length of the said still. The pipe, 6, is flattened in cross-section and is perforated with fine holes, 7, 7, throughout its length. As this tube is the return pipe for the evaporated ammonia, the returning refrigerant is quickly and efficiently brought into contact with and spread throughout the mass of the storing material and rapidly taken up by said storing material. A water circulating cooling coil is shown at 8 surrounding the still, 1, and embodied in a layer of insulating material, 9, the pipe, 8, being connected by a pipe, 10, to a two-way valve, 11, and to a waste-pipe, 12. An exit pipe, 13, is sealed, into the wall of the still, 1, the inner end being provided and covered with several layers of the finest mesh wire cloth or gauze, 14, for preventing particles of the storing material from being carried into the pipe, 13. A filter, 15, is inserted in the pipe, 13, and in the neighborhood of the still, 1, and consists, as shown in detail in Fig. 2, of a tube, 16, perforated with fine holes and covered with fine mesh metal gauze, 17, over which is wrapped several layers of Swedish filter paper, 18, and over the filter paper is wrapped several layers of fine metal gauze, 19, the whole being tied securely into place about the exit pipe, 20, of the filter, 15.

The exit pipe, 13, leads to an intermediate or condensing chamber, 21, and passes through the cooling coil, 22, of said chamber, the cooling coil, 22, being connected by a pipe, 23, with the two-way valve, 11, and with the waste-pipe, 12. A one-way check valve, 24, is included in the pipe, 13. A capillary, 25, connects the condensing chamber, 21, with an evaporating or refrigerating chamber, 26, and a return pipe, 27, connects the refrigerating chamber, 26, with a pipe, 6, of the still, 1, a one-way or check valve, 28, being included in the said pipe, 27, and permitting the passage of the refrigerant only in the direction of the still.

A brine tank, 29, surrounds the refrigerating chamber, 26, and is provided with drawers, 30, 30, mounted in the reentrant portions of said brine tank where water may be frozen into cakes in said drawers for table use or for general use. The return pipe, 27, as it leaves the refrigerating chamber, 26, is passed into the top of the brine tank in zigzag formation, as shown at 31.

The two-way valve box, 11, is provided with a valve, 32, (shown in dotted lines) and connected to a bar, 33, of magnetic material, which oscillates in the lateral extensions, 34 and 35, of the box, 11, under the influence of magnet coils, 36 and 37, wound on said lateral extensions.

An electrical control system for the apparatus is provided and as fully set forth in my prior application, Serial No. 359,882, filed February 19, 1920, comprises a rocking beam (not shown) connected to armatures, 38 and 39, of coils, 40 and 41. A number of switches, 42, 43 and 44, are mounted on said rocking beam and by the movement thereof are shifted from one position to another, so that the said switches make and break alternately, the switch, 44, being a time switch for cutting out the water valve shifting current after it has done its work. The heater, 4, for the still is connected by a wire, 45, to one side of a suitable source of current, 46, 47, by means of a wire, 48, through the switch, 42, and wires, 49 and 50, to the other side, 47, of the said source of current.

The evaporating or refrigerating chamber, 26, is provided with a tube, 51, on which a glass float, 52, slides. A pivoted bar, 53, is mounted on the tube, 51, but insulated therefrom by glass or jewel pivot bearings, and is connected by a wire, 54, with the main, 47. Wire, 55, terminates in a contact, 56, inside the chamber, 26, and in operative relation to a contact, 57, on the bar, 53. Wire, 58, terminates in a contact, 59, in the said chamber and in operative relation to a contact, 60, on the said bar, 53. An arm, 61, extends from the bar, 53, into the path of the glass float, 52, and a wire, 62, depends from said bar, 53, through the tube, 51, and terminates in a button, 63, at the bottom of the well, 64. A wire, 65, extends from a point between the coils 40 and 41, and is connected to the main, 46, by a wire, 66.

In operation, when the liquid in the chamber, 26, has fallen to the point where the float, 52, rests on the button, 63, and depresses the same, causing a downward pull on the wire, 62, bringing the contacts, 56, 57, together, current then flows from the main, 46, through the wires, 66, 65, the coil, 40, the wire, 55, and the wire, 54, to the main, 47, causing the coil, 40, to attract the armature, 38, and thus shift the switches, 42, 43 and 44, to the position where the switch, 42, is closed, the switch, 43, is open and the mercury in the time switch, 44, is beginning to move to break contact on one side thereof. The closing of the switch, 42, causes current to flow from the main, 46, through the wire, 45, the heater coil 4, the wire, 48, the switch, 42, the wire, 49, and the wire, 50, to the main, 47. At the same time, current flows through a shunt circuit comprising the wire, 67, the coil, 37, the wire, 68, down the right hand side of the switch, 44, to the wire, 66, to the main, 5, actuating the coil, 37, which draws the armature, 33, on which the water valve, 32, is mounted, shifting the valve to permit water to flow through the pipe, 23, to the cooling coil, 22, on the condenser, 21. The mercury in the switch, 44, has been moving slowly through the capillary and when a sufficient time has elapsed, say five seconds, to insure that the water valve has been moved over to send the water through the pipe, 23, the circuit through the right hand side of the switch, 44, will be opened, thus breaking the shunt circuit through the coil, 37. In the meantime, with current flowing through the heater coil, 4, ammonia vapor will be distilled over through the pipe, 13, to the condensing chamber, 21, and will collect therein. In a short time sufficient liquid will have been passed from the chamber, 21, through the capillary, 25, and will have collected in the well, 64, of the refrigerating chamber, 26, to raise the float, 52, off the button, 63, whereupon the bar, 53, will drop out of connection with the contact, 56, thus breaking the circuit through the switch shifting coil, 40. As the distilling operation proceeds, the level of the liquid in the chamber, 26, is raised until the float, 52, comes in contact with the arm, 61, raising the arm, 61, and the contact, 60, into connection with contact, 59, whereupon current flows from the main, 46, through wires, 66, 65, the coil, 41, the wire, 58, the bar, 53, the wire, 54, to the main, 47, causing the coil, 41, to attract its armature, 39, and shift the switch, 43, into the closed position and break the heater circuit through the switch, 42, thus cutting off the heater coil on the still, 1. At the same time, current flows from the main, 46, the wire, 66, the left hand side of the switch, 44, the wire, 69, the coil, 36, the wire, 70, the switch, 43, the wire, 71, the wire, 50, to the main, 47, the coil, 36, drawing the armature, 33, in which the water valve, 32, is mounted to the position where water is permitted to flow through the pipe, 10, to the cooling coil, 8, on the still, 1. The mercury on the left hand side of the switch, 44, when say five seconds have elapsed, will have moved over to the right hand side of the said switch and broken the circuit through the left hand side thereof, cutting out the current through the coil, 36. The liquid collected in the chamber, 21, passes through the capillary, 25, to the bottom of the expansion or refrigeratng chamber, 26, and the volume of liquid delivered by the said capillary is controlled by three variables, the diameter and length of the capillary and the pressure difference. It follows from this that the amount of liquid delivered by this capillary varies inversely as the viscosity, or directly as the fluidity. Consequently, in the summer time, when a rapid rate of delivery by the capillary is desired, the temperature of the cooling water is higher, producing a higher ammonia pressure, the fluidity greater, and hence the rate of delivery is greater, other things being equal. When the delivery of the refrigerant from the chamber, 21, is completed, and the refrigerant in the chamber, 26, has evaporated and been drawn back into the storing material in the still, 1, the float, 52, will rest on the button, 63, making contact between the wires 54 and 55, energizing the coil, 40, and the series of operations first above described and attendant upon the distillation period will be repeated automatically.

The storing material in the still, 1, is an important element in the refrigerator apparatus and should preferably be a solid material capable of taking up the refrigerant and holding it in such a physical state as to maintain its vapor pressure below that of the free liquid. Several important factors enter into the production of a practical and highly efficient storing material to be used in a safe refrigerator apparatus, and the desirable properties or qualities of such a material are:

1. It must be stable at elevated temperatures;
2. It must not react under any conditions of use with the metal used to contain it;
3. The unit weight of the material must take up a large amount of refrigerant;
4. Its heat capacity must be as small as possible; and
5. The speed with which it takes up the refrigerant must be large enough to produce effective and efficient refrigeration at the point from which it is drawing the refrigerant.

I have found that by special treatment of cellular material, such as charcoal, with certain metallic salts, for example, zinc chloride, chromic acid, etc., a substance is produced which I term "activated charcoal" and one well suited as a storing material for use in refrigerating apparatus. This material condenses the refrigerant on its surfaces, holding it with great tenacity at room temperature, and readily and completely giving it up at moderately elevated temperatures, 150° C. The use of "activated charcoal" as a storing material in refrigerating machines, due to its large bulk per unit weight necessitates a large still which in turn offers a large surface for radiation involving a possible diminution in the efficiency of operation of the apparatus, as compared with the efficiencies obtainable when other materials are used. The great advantage, however, of an adsorbent such as charcoal is that it takes up the refrigerant with extreme rapidity and this is an advantage at the end of the distillation period when it is necessary to start the return of the refrigerant promptly from the refrigerating chamber. For example, one gram of charcoal in its optimum state of activity has a heat capacity of about .25 calories per gram. The maximum amount of ammonia, for example, which a certain sample will take up is, for example, 0.125 and the heat necessary to drive this off at 150° C. is about 75 calories. In heating to 150° C. therefore, about 38 calories are used up owing to the heat capacity of the adsorbent material so that 26 per cent of the energy has been thrown away on heating the material. It is clear therefore that an increase in efficiency would be obtained if less heat were necessary to disengage the gas from the storing material and less heat were necessary to raise the material to the point where the refrigerant is given up. A variety of substances were considered as storing materials for refrigerating machines and calcium chloride settled upon as the most feasible material. Each gram of the last named substances takes up 1.22 grams of ammonia and the ammonia moreover enters into chemical combination as stated in the formula $CaCl_2.8NH_3$. There are other calcium chloride compounds, one said to contain 4 molecules of ammonia, but the formula given corresponds to the maximum amount of ammonia and moreover possesses a very small pressure of ammonia at ordinary temperature. It was found in using this material alone that the rate at which it would take up ammonia was very small due to a tendency to pulverize and to pack, thus preventing ready access of the refrigerant.

It became, therefore, a problem of discovering the best physical state and mode of preparation of this material so as to maintain it in the still under the conditions of operation in such a state that it would expose the maximum surface and remain in a friable, porous, condition offering no resistance to the free circulation of the refrigerant. It was found that Portland cement mixed with the chloride to the amount of 10 to 15 per cent and sufficient water to form a thick paste could be slowly baked in the presence of ammonia so as to give a material in hard porous grains which maintained their form under repeated heating and cooling in the distilling and taking up of the ammonia. This material, however, while serviceable may develop a tendency, due to its composition, to dehydrate, when operated at extremely elevated temperatures.

It has been known for a long time that zinc chloride forms with zinc oxide certain oxychlorides which are in effect hard cement and it is a fact of common observation that sodium silicate will, upon heating, blow up to a porous, spongy mass. I make use of the above mentioned characteristics of these substances to produce a hard porous storing material for refrigerant gases and liquids having a large taking up capacity together with a high rate of taking up, the physical structure being such as to persist and withstand the disintegrating action of rapid heating and cooling and changes of volume produced by taking up and disengaging refrigerant, as follows:

Dry calcium chloride is mixed with 10 per cent of molecular proportions dry zinc oxide (ZnO) and zinc chloride (ZnCl2). After thorough incorporation in a ball mill it is then moistened with sodium silicate (in sufficient amount that there will be 3 per cent of sodium silicate in the mixture when dry) and the pasty mass dried in a current of ammonia at about 250° C. The material is then broken up and sifted and then reheated to 500° to 600° C. in the presence of ammonia, whereupon an extremely porous, hard material is obtained which possesses the quality of taking up ammonia with great rapidity, and, moreover, one which does not decompose on heating to a high temperature (700–750° C.).

When either one of the calcium chloride mixtures is used alone as the storing material, due to the fact that it is of small bulk and possesses the property of rapidly taking up a large amount of refrigerant per unit weight when cooled and readily giving it up when heated to a temperature of about 150° C., a smaller containing still is used in the apparatus than when activated charcoal alone is used as the storing material therein, and the radiation losses at the still of the apparatus are therefore minimized. In fact, I have found by mixing approximately equal volumes of activated charcoal and one or the other of the above mentioned calcium chloride mixtures in a small still, the charcoal serving to support and to maintain even distribution of the chloride mixture throughout the still and aiding to promptly start the refrigerating period due to the extreme speed with which it takes up the refrigerant, that highly efficient operation of the apparatus is obtained.

The storing material is loaded into the still 1 through an opening, 72, in the bottom of the still, which opening is sealed by a suitable plug.

This application is a continuation in part of my application Serial Number 186,692, filed Aug. 17, 1917.

I claim:

1. In a refrigerating apparatus, the combination of a distilling chamber, a condensing chamber connected to said distilling chamber, a refrigerating chamber, a capillary tube connecting said condensing chamber to said refrigerating chamber, a one way fluid connection from said refrigerating chamber to said distilling chamber, and means in said refrigerating chamber for controlling the operation of the apparatus.

2. In a refrigerating apparatus, the combination of distilling and refrigerating chambers, a refrigerant in said apparatus, and a hard porous refrigerant storing material in said distilling chamber, and a gas filter at the outlet from said distilling chamber for preventing particles of the storing material being carried out of said chamber by the refrigerant gas stream.

3. In a refrigerating apparatus having a refrigerating chamber and a refrigerant in said apparatus and controlled as to its cyclic operation by refrigerant liquid level in said refrigerant chamber, in combination, a distilling chamber, a condensing chamber connected to said distilling chamber, a refrigerating chamber, a one-way fluid connection from said refrigerating chamber to said distilling chamber, and means for automatically controlling fluid flow from said condensing chamber to said refrigerating chamber comprising a flow restricting device connecting said condensing chamber and said refrigerating chamber.

4. In liquid level control for electric circuits in a refrigerating system of the type described, the combination of a chamber connected to collect and discharge liquid refrigerant, a float to rise and descend with said liquid, electric circuit contacts in said chamber above the highest level attainable by liquid refrigerant therein, and means, operated by the float at its upper and lower positions, controlling circuit closures at said contacts.

5. In a refrigerating apparatus, in combination, a distilling chamber, a condensing chamber connected thereto through a one-way conduit to said condensing chamber, a refrigerating chamber and a one-way conduit therefrom to said distilling chamber, a flow restricting device between said condenser and said refrigerating chamber, and means controlled by the liquid level of the refrigerant for controlling the cyclic operations of said refrigerating apparatus.

In testimony whereof I hereto affix my signature.

FREDERICK G. KEYES.